US009859708B2

(12) United States Patent
Buhl et al.

(10) Patent No.: US 9,859,708 B2
(45) Date of Patent: Jan. 2, 2018

(54) SIGNALING AND CONTROLLING A POWER GRID COUPLING ACTUATORS

(71) Applicant: SIEMENS AKTIENGESELLSCHAFT, München (DE)

(72) Inventors: Michael Bernhard Buhl, Grafing (DE); Michael Metzger, Markt Schwaben (DE); Sebastian Nielebock, Forchheim (DE); Rudolf Sollacher, Eching (DE); Andrei Szabo, Ottobrunn (DE)

(73) Assignee: Siemens Aktiengesellschaft, München (DE)

( * ) Notice: Subject to any disclaimer, the term of this patent is extended or adjusted under 35 U.S.C. 154(b) by 148 days.

(21) Appl. No.: 14/907,484

(22) PCT Filed: Jul. 25, 2013

(86) PCT No.: PCT/EP2013/065744
§ 371 (c)(1),
(2) Date: Jan. 25, 2016

(87) PCT Pub. No.: WO2015/010743
PCT Pub. Date: Jan. 29, 2015

(65) Prior Publication Data
US 2016/0172856 A1 Jun. 16, 2016

(51) Int. Cl.
*H02J 3/00* (2006.01)
*H02J 3/12* (2006.01)
(Continued)

(52) U.S. Cl.
CPC ............... *H02J 3/12* (2013.01); *H02J 3/383* (2013.01); *H02J 3/386* (2013.01); *H02J 3/387* (2013.01);
(Continued)

(58) Field of Classification Search
CPC .... H02J 3/12; H02J 3/387; H02J 3/383; H02J 3/386; H02J 3/381; H02J 13/002;
(Continued)

(56) References Cited

U.S. PATENT DOCUMENTS 4,319,224 A 3/1982 Tappeiner et al.
6,177,884 B1 * 1/2001 Hunt ...................... G01R 11/16
324/126

(Continued)

FOREIGN PATENT DOCUMENTS

CN 102377456 A 3/2012
EP 0581351 A1 2/1994
(Continued)

OTHER PUBLICATIONS

Alwin Burgholte (Prof.): "Power Quality—Beeinflussung durch Oberschwingungen," Fachhochschule Oldenburg Ostfriesland Wilhelmshaven, Wissenschaftliche Einrichtung Mechatronik, Labor Leistungselektronik und EMV, gefunden im Internet am Jul. 25, 2013, unter http://staff.fh-oow.de/schuermann/DOWNLOAD/POWER/NEU/PQ-Oberschwingung.pdf.
(Continued)

*Primary Examiner* — Kenneth B Wells
(74) *Attorney, Agent, or Firm* — Lempia Summerfield Katz LLC

(57) ABSTRACT

A method for signaling and controlling in a power grid coupling a plurality of actuators for providing power signals is provided. At a first actuator, a voltage problem is detected, a communication signal is generated based on the detected voltage problem, and the generated communication signal is transmitted over the power grid. At a second actuator, the transmitted communication signal is received, a control action is generated based on the received communication
(Continued)

signal and the generated control action is transmitted over the power grid towards the first actuator.

20 Claims, 5 Drawing Sheets

(51) Int. Cl.
*H02J 13/00* (2006.01)
*H02J 3/38* (2006.01)

(52) U.S. Cl.
CPC ............ *H02J 13/002* (2013.01); *H02J 3/381* (2013.01); *Y02E 40/72* (2013.01); *Y02E 60/7815* (2013.01); *Y04S 10/12* (2013.01); *Y04S 40/121* (2013.01)

(58) Field of Classification Search
CPC .... Y04S 10/12; Y04S 40/121; Y02E 60/7815; Y02E 40/72
See application file for complete search history.

(56) References Cited

U.S. PATENT DOCUMENTS

| | | | | |
|---|---|---|---|---|
| 6,615,376 | B1* | 9/2003 | Olin | G06F 3/0481 714/25 |
| 7,236,765 | B2* | 6/2007 | Bonicatto | H04B 3/54 340/12.37 |
| 7,714,735 | B2* | 5/2010 | Rockwell | G01R 19/2513 324/126 |
| 7,808,128 | B1 | 10/2010 | Weber, Jr. et al. | |
| 7,930,141 | B2* | 4/2011 | Banting | G01R 19/2513 324/512 |
| 8,862,938 | B2* | 10/2014 | Souvannarath | G06F 11/0709 709/208 |
| 8,941,354 | B2* | 1/2015 | Song | H04Q 9/00 320/116 |
| 9,353,732 | B2* | 5/2016 | Gupta | H02J 3/386 |
| 9,714,641 | B2* | 7/2017 | Bagnara | F03D 9/255 |
| 9,722,416 | B2* | 8/2017 | Nielsen | H02H 7/1216 |
| 2006/0271313 | A1 | 11/2006 | Mollenkopf | |
| 2013/0134779 | A1 | 5/2013 | Watanabe et al. | |
| 2015/0145332 | A1 | 5/2015 | Bamberger et al. | |

FOREIGN PATENT DOCUMENTS

| | | |
|---|---|---|
| RU | SU900362 A1 | 1/1982 |
| RU | SU1372465 A1 | 2/1988 |
| RU | 2014153898 A | 8/2016 |

OTHER PUBLICATIONS

Oliver Lang, Device GmbH, "Spannungsqualität, ein Durchblick," Dec. 33, 2009, im Internet gefunden am Jul. 25, 2013 unter http://Idew.de/bdew.nsf/id/DE__Meistererfahrungsaustausc__2009/$file/2__Lang_DEVICE_PQ_Messung.pdf.

Schmer, Gunter (May 2000), "DTMF Tone Generation and Detection: An Implementation Using the TMS320C54x," Application Report, SPRA096a, Texas Instruments; retrieved on Jul. 25, 2013 under http://www.ti.com/lit/an/spra096a/spra096a.pdf.

PCT International Search Report and Written Opinion of the International Searching Authority dated May 13, 2014 for corresponding PCT/EP2013/065744.

Chinese Office Action for related Chinese Application No. 201380078461.4 dated Oct. 9, 2017.

Russian Office Action for related Russian Application No. 2016106116 dated Sep. 6, 2017, with English Translation.

* cited by examiner

SIGNALING AND CONTROLLING A POWER GRID COUPLING ACTUATORS

CROSS-REFERENCE TO RELATED APPLICATION

This application is the National Stage of International Application No. PCT/EP2013/065744, filed on Jul. 25, 2013, the entire content of which is hereby incorporated by reference in its entirety.

FIELD

The disclosed embodiments relates to a method and to a device for signaling and controlling a power grid coupling a plurality of actuators for providing power signals.

BACKGROUND

In power grids, like energy distribution grids with high penetration of actuators like renewable energy sources, one challenge is to satisfy a quality requirement for the electricity, especially satisfying voltage limits and overloads of power components, like transformers or power lines.

The control of power grids with high penetration of actuators is challenging because the control paradigm changed from a few large power generators to many local small generators, e.g. voltaic generators, biogas generators or small wind turbines. Small generators are weaker than large power generators when connected. Due to the large number of local generators, coordinated control and the required communication are hard to realize.

For controlling power grids, model based control schemes may be used conventionally. Therein, the dependency of the voltage of the nodes in the power grid on the control variables, e.g., reactive and active power, is determined based on the electrical properties of the power grid. Electrical properties may be measured or obtained by modeling. Obtaining an accurate model, especially for distribution grids that are extensive in dimensions, is expensive and difficult to maintain.

In most conventional control schemes, dedicated communication channels are used. For example, mobile communication channels like 2G, 3G or 4G, Wi-max, or wired communication, like Digital Subscriber Line (DSL), or Power Line Communication (PLC) may be used. Further, signaling in power systems is also achieved using so-called load management communication systems. In these systems, large power signals are used at frequencies in a range of 100 Hz to 2 kHz to inform loads about switching between different tariffs or to control the switching of loads. But these large power signal communications are only one-directional, from the power grid injection point to the loads, in particular broadcast. So, conventional load management communication systems cannot be used for signaling voltage problems between actuators in a power grid.

SUMMARY AND DESCRIPTION

Accordingly, an object of the disclosed embodiments is to provide improved signaling and controlling in a power grid.

A method for signaling and controlling in a power grid coupling a plurality of actuators for providing power signals is provided. In a first act, at a first actuator of the actuators, a voltage problem is detected, a communication signal is generated based on the detected voltage problem, and the generated communication signal is transmitted over the power grid. In a second act at a second actuator of the actuators, the transmitted communication signal is received, a control action is generated based on the received communication signal and the generated control action is transmitted over the power grid towards the first actuator.

Presently, the control action is generated based on or as a function of the received communication signal. Thus, the first actuator may transparently use the help of the second actuator or a device coupled to the second actuator forming a common node in the power grid.

As a result, a decentralized control is advantageously possible. Therefore, no extra central control unit is needed.

Furthermore, no topology information is needed. By generating the control action in dependence on the communication signal, in particular on the amplitude of the communication signal, an optimal use of reactive and/or active in the power grid is possible.

Thus, the present control scheme may also be called a self-organized control scheme. Furthermore, the present communication signal may be also be referred to as a signaling signal because the communication signal is used for signaling a voltage problem to coupled actuators or nodes.

In the disclosed embodiments, the dependency of the control action on the voltage problem, and therefore the communication signal, may be detected online at the second actuator. Thus, the control scheme may also be called a model-free control scheme, where, for example, only an analogue value for communicating the amount of the voltage problem is transmitted from the first actuator to the second actuator. Because of transmitting only one analogue value, no voltage band violations may occur. Further, no dedicated communication channel is used for transmitting the present communication signal because the communication signal can be directly transmitted over the power grid.

The actuators coupled by the power grid may include inverters connected to generators and consumers where the active and/or the reactive power may be controlled, e.g. photovoltaic generators, storage systems, stationary batteries, batteries from electromobility, wind turbines. Other generators and consumers that can control active power include fossil generators, combined heat and power generators, biogas generators, consumers with variable power and/or switching equipment, including transformers equipped with controllable tap changes.

The generated control action may include injecting active power, e.g., a current, into the power grid, injecting reactive power into the power grid, and/or changing a transformer tap.

According to some implementations, the communication signal has a frequency close to the nominal frequency or fundamental frequency of the power grid. The advantage of using such a communication signal is that the level of the received signal is proportional with the grid impedance seen by the receiving actuator (second actuator). The grid impedance is the proportionality factor in the amount that the receiving actuator may influence the voltage at the transmitting actuator using reactive and active power. The node or actuator having the voltage problem then controls the help received from other actuators. The degree of help is automatically proportional with how much the other actuators can influence the voltage at the node or actuator's connection point in the power grid.

According to an embodiment, the control action is generated with amplitude as a function of the amplitude of the received communication signal.

In particular, the communication signal is transmitted over the power grid and has a frequency close to the fundamental frequency of the power grid. The advantage of using such a signal is that the level of the received communication signal is proportional with the grid impedance seen by the receiving actuator. Further advantageously, grid impedance is the proportionality factor in the amount that the receiving actuator can influence the voltage at the transmitting actuator using reactive and active power. In this way, the actuator where the voltage problem appears controls the help that it gets from the other actuator or the other actuators automatically proportional with how much the actuators receiving the communication signal can influence the voltage at its connection.

According to a further embodiment, the control action is generated with an amplitude proportional to the amplitude of the received communication signal.

According to a further embodiment, the control action is generated at the actuator such that the following is fulfilled:

$$\frac{A_{Rx}^C}{A_{Tx}^C} = \frac{A_{Tx}^P}{A_{Tx}^P} \frac{A_{Rx}^C}{A_{Tx}^C} = \frac{A_{Rx}^P}{A_{Tx}^P}$$

wherein $A_{Tx}^C$ designates the amplitude of the generated communication signal at the first actuator, wherein $A_{Rx}^C$ designates the amplitude of the received communication signal at the second actuator, wherein $A_{Tx}^P$ designates the amplitude of the generated control action at the second actuator, and wherein $A_{Rx}^P$ designates the amplitude of the received control action at the first actuator.

By the above equation, the helping actuator may transparently help the actuator asking for help.

According to a further embodiment, at at least two second actuators of the plurality of actuators, the transmitted communication signal is received, a respective control action is generated based on the respective received communication signal and the respective generated control action is transmitted over the power grid towards the first actuator.

In particular, multiple actuators may help the actuator asking for help by the communication signal using different control actions. The control actions of the group of second actuators may differ because each second actuator receives a different level of the communication signal in the power grid, respectively.

According to a further embodiment, the communication signal is a current injected into the power grid by the first actuator.

The communication signal is modulated onto the power signals.

According to a further embodiment, the communication signal is generated such that the current has a frequency proportionally related to the fundamental frequency of the power signals transmitted by the actuators over the power grid.

According to a further embodiment, the communication signal is generated such that the current is a harmonic of the fundamental frequency of the power signals transmitted by the actuators over the power grid.

One advantage is to use harmonics of the power signal for the communication signal because the fundamental frequency or fundamental component (50 Hz) is present at all the nodes (actuators) with identical frequency and may be used to provide synchronization for the communication.

According to a further embodiment, the communication signal is generated such that the current is an even harmonic, in particular a second harmonic, of the fundamental frequency of the power signals transmitted by the actuators over the power grid.

Even harmonics are almost interference free and only affect a background noise of about 0.06%. Further, the communication may be synchronized by the fundamental component (50 Hz) that has the same frequency everywhere in the grid. Further, the relevant norms allow up to 2% amplitude of the signal that is also sufficient for detection at the actuators. Thus, the level of the even harmonics is very low while one of the odd harmonics may be significant.

According to another embodiment, the communication signal is generated such that the current is an inter-harmonic of the fundamental frequency of the power signals transmitted by the actuators over the power grid.

Also the use of interharmonics, e.g. ¾ of the fundamental frequency or ⅘ of the fundamental frequency, is possible. The modulation and especially demodulation may be more complex using interharmonics. The advantage of the harmonics is that in one period of the fundamental frequency an integer number of the periods of the harmonics may be sent and detected. The synchronization of the transmission and of the detection may be realized by the beginning of the period of the fundamental frequency. In case of interharmonics, either multiple periods of the fundamental frequency is used for the transmission or complete periods of the inter harmonics may be transmitted. In the first case, a synchronization of the bursts has to be realized. In the second case, the detection may be distorted.

According to a further embodiment, the communication signal is modulated by On/Off keying.

The use of On/Off keying, On/Off modulation or an alternative time multiple access scheme facilitates the sending of stronger signals and also the detection of possible interference on the same harmonics. Further, the norms on the mean RMS (root mean square) value are satisfied by detecting and cancelling the interferences, and the robustness of the whole system may be increased. Moreover, an estimation of the number of the transmitters in the power grid may be facilitated, in particular by evaluating the number of occupied slots in one transmission period.

According to a further embodiment, the modulated communication signal is synchronized by the fundamental frequency of the power signals.

The fundamental frequency or fundamental component of the power signals is used for synchronizing the communication, in particular the communication signals. The fundamental component has the same frequency at all the nodes of the power grid and phase differences are very small, in particular in distribution grids. Consequently, in the case of multiple transmitters, the signals add up in-phase and also the timing of the On/Off modulation may be realized. Thus, in-phase transmission from different transmitters is facilitated. Without synchronization, the signals from different transmitters may cancel each other out. Detecting the phase of the transmitted signals is possible because the fundamental component may act as phase reference. Furthermore, time division of the transmission period is facilitated used in the On/Off modulation.

According to another embodiment, as long as a voltage problem is detected at the first actuator, a communication signal is generated based on the detected voltage problem and transmitted over the power grid each transmission period. The transmission period includes N periods of the fundamental frequency of the power signals, with $N \geq 2$.

As long as the voltage problem remains at the first actuator, a communication signal is transmitted over the power grid. The level of the communication signal transmitted over the power grid may change over time. The change of the level is dependent on the level of the detected voltage problem.

According to a further embodiment, the following acts are executed at the first actuator: detecting the fundamental frequency of the power signals, defining the transmission period with N transmission slots, selecting one transmission slot within the N transmission slots for transmitting the communication signal, calculating an amplitude of the current of the communication signal based on the detected voltage problem, and injecting the current with the calculated amplitude and the frequency of the second harmonic of the fundamental frequency of the power signals in the selected transmission slot into the power grid.

Another embodiment relates to a computer program product including a program code for signaling and controlling in a power grid coupling multiple actuators providing power signals when run on at least one computer.

A computer program product, like a computer program means, may be embodied as a memory card, USB stick, CD-ROM, DVD or as a file that may be downloaded from a server in a network. For example, the computer program product may be provided by transferring the respective file with the computer program product from a wireless communication network.

According to another embodiment, a device for signaling and controlling a power grid coupling a plurality of actuators providing power signals is provided. The device includes a first entity and a second entity. The first entity is coupleable with a first actuator of the actuators and configured to generate a communication signal based on a detected voltage problem and to transmit the generated communication signal over the power grid.

The second entity is coupleable with a second actuator of the actuators and configured to receive the transmitted communication signal, to generate a control action based on the received communication signal, and to transmit the generated control action over the power grid towards the first actuator.

The device may be a plug and play device that is coupleable with any actuator in the power grid. Thus, the configuration is very simple and no expert knowledge is needed.

Embodiments may be implemented in hardware and/or in software. If an embodiment is implemented in hardware, it may be embodied as a device, e.g. as a computer or as a processor or as a part of a system, e.g. a computer system. If the embodiment is implemented in software it may be embodied as a computer program product, as a function, as a routine, as a program code or as an executable object.

According to yet another embodiment, a power grid is provided that couples a plurality of actuators for providing power signals. Each of the multiple actuators includes a device as described herein.

The scope of the present invention is defined solely by the appended claims and is not affected to any degree by the statements within this summary. The present embodiments may obviate one or more of the drawbacks or limitations in the related art.

DESCRIPTION OF THE FIGURES

In the Figures, like reference numerals designate like or functionally equivalent elements unless otherwise indicated.

DETAILED DESCRIPTION

Figure 1:
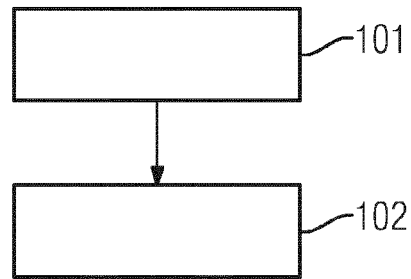
FIG. 1 illustrates an embodiment of signaling and controlling in a power grid coupling multiple actuators.

In FIG. 1, a first embodiment of a sequence of method steps for signaling and controlling in a power grid G (see FIG. 2 or 3) coupling a plurality of actuators A, B, C for providing power signals is depicted.

Figure 2:
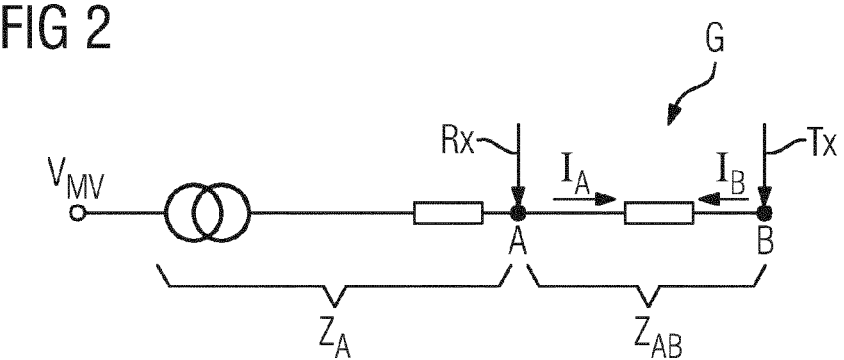
FIG. 2 illustrates an example of a representation of a power grid.
Figure 3:
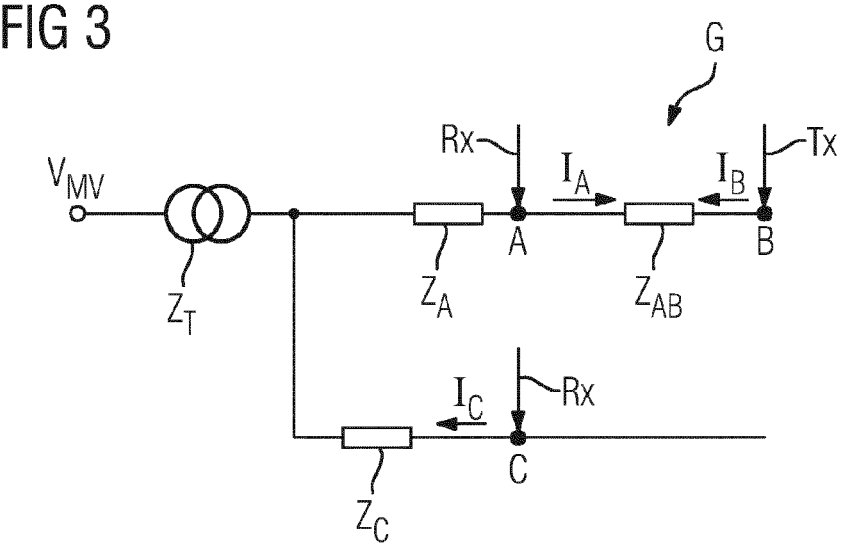
FIG. 3 depicts another example of a representation of a power grid.

In act 101, at the actuator B of the actuators A, B, C, a voltage problem is detected. In case that a voltage problem is detected, a communication signal $I_B$ based on the detected voltage problem is generated at the actuator B. Then, the generated communication signal $I_B$ is transmitted over the power grid G by the actuator B. FIGS. 2 and 3 illustrate simple representations of the power grid G. In FIGS. 2, 3, Tx indicates the transmitting node, here B, where Rx indicates the receiving node, in FIG. 2 node or actuator A, and in FIG. 3 nodes or actuators A, C.

In the examples of FIGS. 2 and 3, the actuator B may be also called transmitting (TX) actuator or first actuator, and the actuators A and C may be also called receiving (RX) or second actuators.

For example, the communication signal $I_B$ is a current injected into the power grid G by the actuator B. In particular, the communication signal $I_B$ is generated such that the current has a frequency that is proportionally related to the fundamental frequency of the power signals transmitted by the actuators A, B, C over the power grid G. For example, the fundamental frequency is 50 Hz.

In particular, the communication signal $I_B$ is modulated by On/Offkeying. Further, the modulated communication signal $I_B$ is synchronized by the fundamental frequency (50 Hz) of the power signals. This is also explained later in very detail.

In step 102, at a second actuator A, C of the actuators A, B, C, the transmitted communication signal $I_B$ is received. In response of receiving such a transmitted communication signal $I_B$, a control action $I_A$, $I_C$ is generated based on the received communication signal $I_B$. In other words, there is a direct link between the received communication signal $I_B$ and the generated control action $I_A$, $I_C$. Then, the generated control action $I_A$, $I_C$ is transmitted by the second actuator A, C over the power grid G towards the first actuator B.

In particular, the control action $I_A$, $I_C$ is generated such that its amplitude is a function of the amplitude of the received communication signal $I_B$. In particular, the control action $I_A$, $I_C$ is generated such that its amplitude is proportional to the amplitude of the received communication signal $I_B$.

In particular, the control action $I_A$, $I_B$ is generated at a second actuator A, C such that the following is fulfilled:

$$\frac{A_{Rx}^C}{A_{Tx}^C} = \frac{A_{Rx}^P}{A_{Tx}^P}$$

wherein $A_{Tx}^C$ designates the amplitude of the generated communication signal $I_B$ at the first actuator B, wherein $A_{Rx}^C$ designates the amplitude of the received communication signal $I_B$ at the second actuator A, C, wherein $A_{Tx}^P$ designates the amplitude of the generated control action IA, IC at the second actuator A, C, and wherein $A_{Rx}^P$ designates the amplitude of the received control action IA, IC at the first actuator B.

For the case that at least two second actuators A, C of the plurality of actuators A, B, C are receiving the transmitted communication signal $I_B$, as shown in FIG. 3, a respective control action $I_A$, $I_C$ is generated based on the respective received communication signal $I_B$, and the respective generated control action $I_B$, $I_C$ is transmitted over the power grid G towards the first actuator B. Because of the different impedances $Z_A$, $Z_{AB}$, $Z_C$ at the different nodes A, C, also the received communication signals $I_B$ are different at the different nodes A, C.

As long as a voltage problem is detected at the first actuator B, a communication signal $I_B$ is generated based on the respective detected voltage problem and transmitted over the power grid G within each transmission period. The transmission period includes N periods of the fundamental frequency (50 Hz) of the power signals.

In more detail, for the example of FIG. 2, a voltage problem may be assumed in the actuator (node) B. The node B generates a communication signal $I_B$ for requesting the help of the actuator in node A by injecting a current $I_B$. Then, the voltage variation measured in node A due to this current will be:

$$\Delta U_A = Z_A \cdot I_B.$$

If the receiver injects a current proportional with $$\Delta U_A (I_A = \alpha \cdot \Delta U_A)$$

in node A, then the voltage difference observed at node B will be $$\Delta U_B = Z_A \cdot \alpha Z_A \cdot I_B.$$

The variation of the voltage at node B that has a voltage problem, produced by actuator A, controlled by the injected current $I_B$ will be $\Delta U_B$ proportional with $I_B$. Consequently, the actuator in node B is able to use transparently the help of the actuator in node A, node A's response being proportional with the control variable $I_B$.

Further on, considering a more complex power grid G with several branches as exemplarily depicted in FIG. 3, the measured signal at node A is $\Delta U_A = (Z_A + Z_T) \cdot I_B$ and the measured signal at node C is $\Delta U_C = (Z_T + I_B)$ are smaller than the signal at node A. The help that node A can provide is equal to $(Z_A + Z_T) \cdot I_A$, larger than that node C can provide that is $Z_T \cdot I_C$, for the same injected current $I_B$. Consequently, the node that can help more (node A) will be the first and the strongest that will help, resulting in an effective use of the available control resources, in particular reactive and active power.

As mentioned above, the communication signal is in a frequency range, so that the power grid impedance at the fundamental frequency of the power grid (50 Hz) can be deduced. At frequencies different than the fundamental frequency, grid norms are imposing limitations for the perturbance, and the communication can be made more reliable.

Nevertheless, the communication signal should not violate the norms. Thus, the use of harmonics of the power signals (50 Hz) is advantageous because the fundamental frequency (50 Hz) is present at all the nodes with identical frequency and may be used to provide synchronization for the communication. In particular, the communication signal $I_B$ is generated such that the current is a harmonic of the fundamental frequency of the power signals transmitted by the actuators A, B, C over the power grid G.

For example, harmonics may be produced by different equipment, with focus on power electronic inverters. Only odd harmonics may be excited (third, fifth, and so on), while the even harmonics (second, fourth, and so on) are not produced. Furthermore, the level of the even harmonics may be very low, while the one of the odd harmonics is significant, as depicted in FIG. 4.

Figure 4:
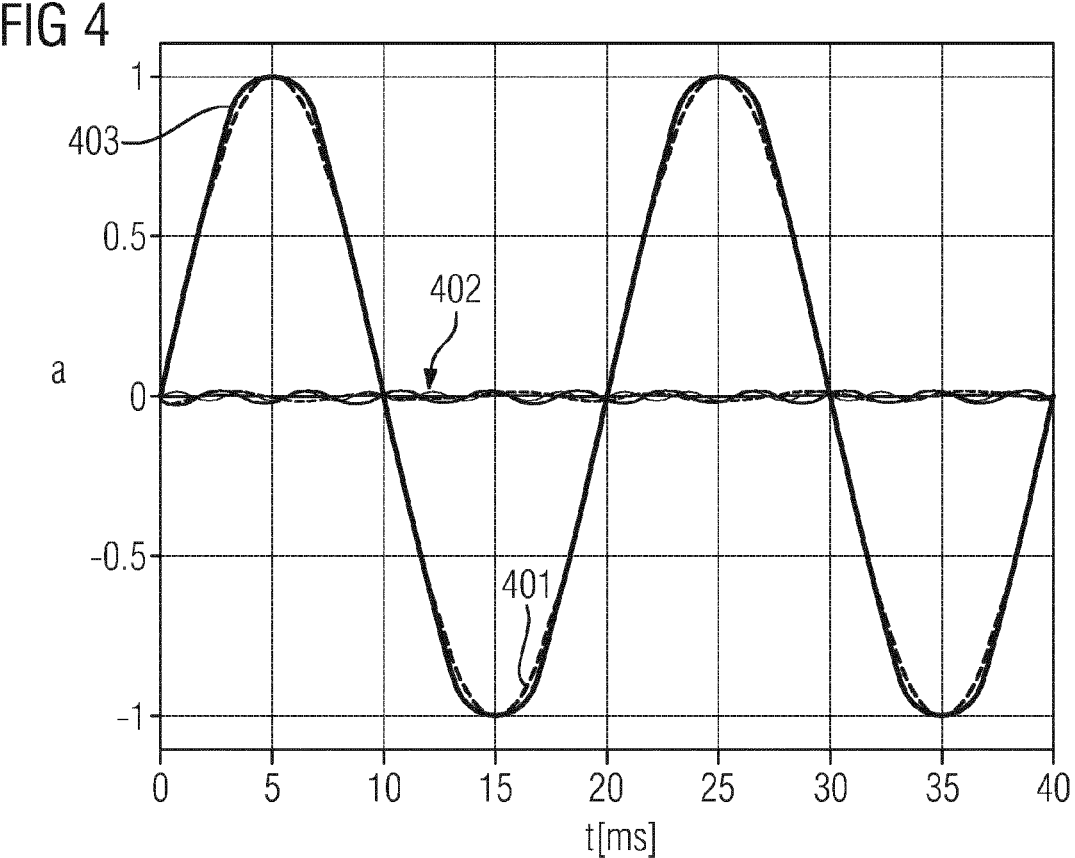
FIG. 4 is a diagram illustrating example fundamental frequency of the power grids and some harmonics.
Figure 5:
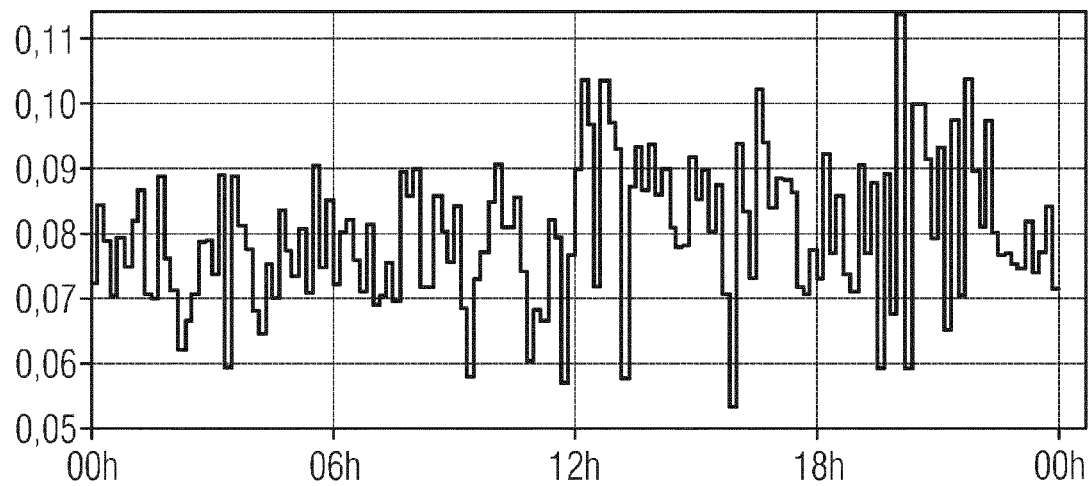
FIG. 5 illustrates a time curve of the amplitude of the second harmonic of FIG. 4.

Furthermore, measurements in a distribution grid of AüW energy provided during a certain project, namely the IRENE project, are illustrated in FIGS. 5 to 8 and confirm the observation of FIG. 4, namely that it is advantageous to use the even order harmonics for the communication signal to keep the properties of the power grid as similar as possible and to avoid interference with the communication load management systems. The second harmonics may be used.

The frequency of the second harmonics lies below the frequencies used in the load management system. If the second harmonic is perturbed, the 4th harmonics can also be used. The load management systems do not pose a real interference, because signals are transmitted seldom and have a short duration.

In the grid impedance, the resistive part is the same at the fundamental frequency and at the harmonics. The reactive part is directly proportional with the frequency, so the reactive part is multiplied with the harmonic number compared with the reactance at the fundamental frequency.

As mentioned above, the use of interharmonics, e.g. ¾ of the fundamental, ⅘ of the fundamental is also possible, but the modulation and especially the demodulation are more complex. The advantage of the harmonics is that in one period of the fundamental an integer number of the periods of the harmonics can be sent and detected. The synchronization of the transmission and of the detection is realized by the beginning of the period of the fundamental frequency. In the case of interharmonics this is not satisfied, so either multiple periods of the fundamental frequencies have to be used for the transmission, or not complete periods of the interharmonics are sent. In the first case, a synchronization of the bursts has to be realized. In the second case, the detection is distorted.

Moreover, the On/Off modulation scheme may be used from transferring the communication signals.

In the norm EN 6100032 (VDE 08382) for example, requirements are imposed on the electrical devices allowing connection to the electrical grid. In this norm, the maximum currents that are allowed to be injected at different harmonics of the power signal are described.

For the second harmonics, it is preferred that the RMS mean value of the current over 1.5 seconds can be maximally 1.08 A and this can be excelled with maximum 150%. A typical cable used in low voltage distribution grids (NAVY 4×150) has the following electrical properties: R=0.206 Ohm/km and X=0.080 Ohm/km.

Injecting a power of 25 kW at the end of a cable of 1 km, it results a voltage increase (roughly computed): as $$\Delta U = (P/3)/UN * R \cong 7.2 \text{ V } 3\%$$

This value is the voltage increase with normally the grid operators are allowing to happen in the low voltage part of the distribution grid. At this level, the inverter may be able to transmit a detectable signal for coordination of the voltage control. The amplitude of the second order harmonics signal that may be achieved over such a line using a current of 1 A is:

$$\Delta U_{100} = I_{100} * (R + t2X) = 0.2 + t0.16 \text{ V}$$

This signal is too small, being easily perturbed by noise.

The solution to avoid limitations based on the size of the signal is to transmit the second harmonic signal only for a short period of time and then not to transmit it for a while. Then, the RMS mean will be smaller than the peak that is transmitted.

For synchronization, the fundamental frequency is used. A transmission period is defined as a group of N periods of the fundamental component. This transmission period is then divided in N slots, each slot of the length of one fundamental period. For one slot, the second harmonic is transmitted (2 periods of the harmonic). While in the other N1 periods, no signal is transmitted. Thus, all the receiving nodes or receivers know that if there is a signal, the signal will be in one of the slots received over N periods of the fundamental of the power signal (50 Hz).

For example, a number of N=50 slots of approximately 20 ms is considered, then the transmission period will be 1 second. If the current is injected for 1 slot, e.g., $\frac{1}{50}$ periods of the time, then maximum amplitude of 7 A for the second harmonics may be allowed, and the RMS value over the period will be $$\sqrt{7^2/50} A \cong 1 \text{ A}$$

The measurable signaling voltage over the 1 km line will be $$\Delta U_{100} ON/OFF = I_{100} ON/OFF * (R + t2X) = 1.4 + t1.12 \text{ V}$$

that may be detected very well.

The power of the signal during the transmission may be $$S = abs(U*I) \cong 12.5 \text{ VA},$$

while the average power may be 0.25 VA, that may be easily implemented with electronics components.

For the communication, an On/Off modulated communication signal is transmitted, the signal consisting of two periods of the second harmonics of the fundamental frequency.

Definitions

Transmission period (shortly termed period): Period of the transmission consisting of N periods of the fundamental frequency. The processing is performed over one period, and the signals are repeated each period.

Figure 6:
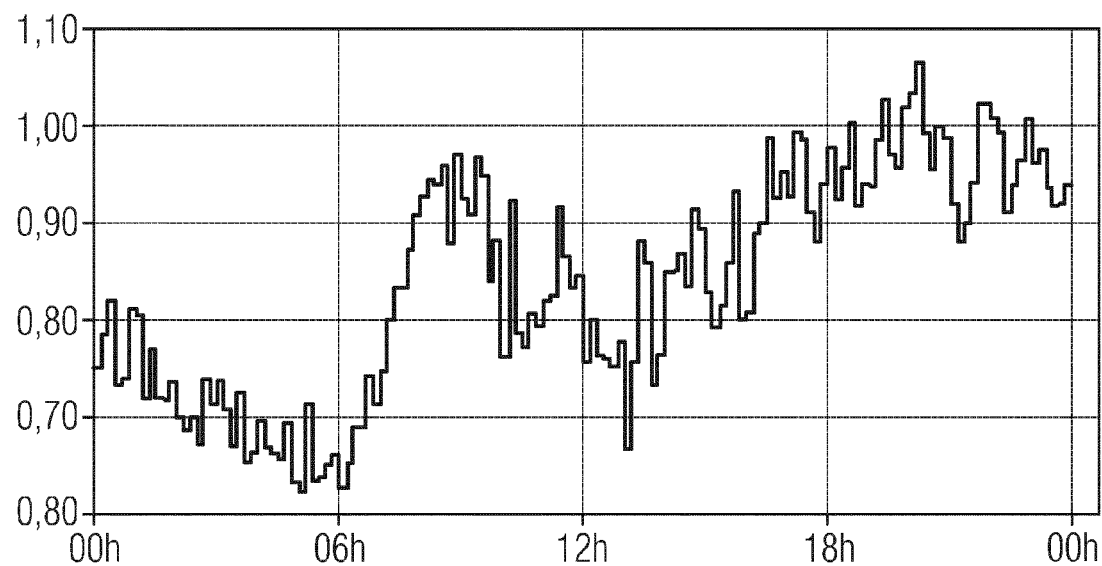
FIG. 6 illustrates a time curve of the amplitude of the third harmonic of FIG. 4.
Figure 7:
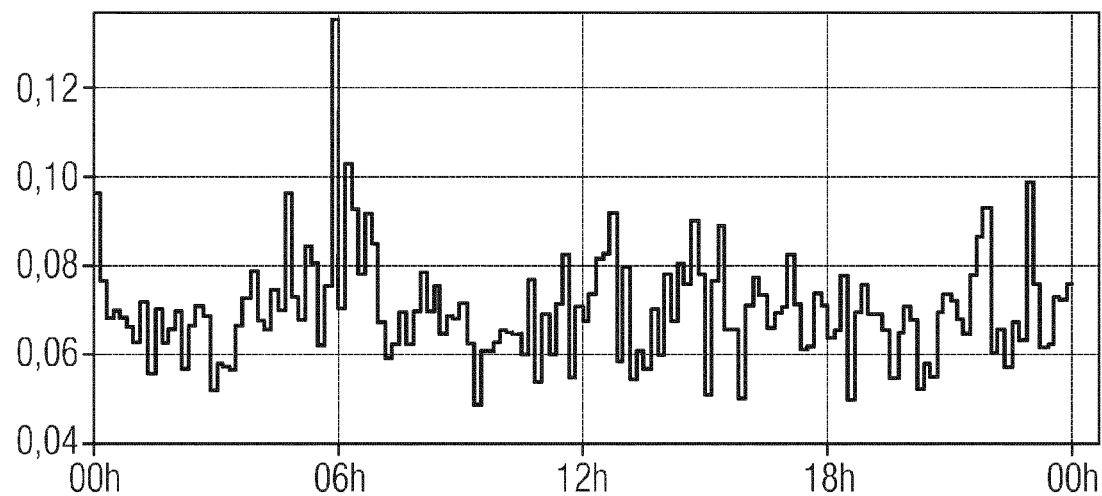
FIG. 7 illustrates a time curve of the amplitude of the fourth harmonic of FIG. 4.
Figure 8:
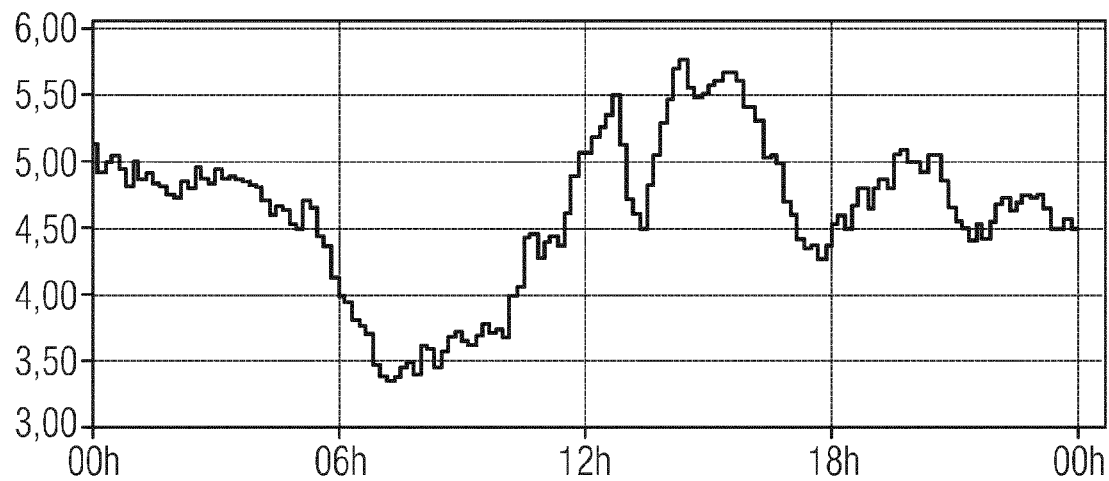
FIG. 8 illustrates a time curve of the amplitude of the fifth harmonic of FIG. 4.

Transmission slot (short termed slot): has the duration of one period of the fundamental frequency. The slot begins when the fundamental component represented as a sinusoid has zero phase, e.g., the voltage line to neutral is 0 and is increasing, as illustrated in FIG. 6.

Transmitter: element in the communication scheme that has a voltage problem and is transmitting a signal to control potential actuators that may receive the signal of the transmitter and may help compensate the voltage. In particular, the transmitters are termed masters. There may be several transmitters simultaneously.

Receiver: all the elements in the communication scheme that may help in the voltage problem. The receivers are also the transmitters. In particular, the receivers are termed slaves.

Parameters

N—number of slots in one period, e.g. N=50;

$I_{100max}$—maximum current used for the communication signal, corresponding to transmitting the maximum value from the controller. The values needed to be transmitted are analogue values between 0 and 1 and are mapped to second harmonics current between 0 and $I_{100max}$, e.g., $I_{100max}$=7 A.

Operation

Each transmitter detects the fundamental component of the power signal, frequency, and phase.

The detected components are used by each transmitter to define the transmission period and each slot.

Periods may not be synchronous between the different transmitters. The periods might start at different moments and/or different multiples of the fundamental component period. Nevertheless, the slots are almost synchronous, being synchronized by the fundamental component.

The difference between the slots of different transmitters and different receivers appears due to phase shift of the fundamental frequency between different nodes. Nevertheless, this phase shift is very limited in the distribution grids, even for extreme cases.

Next, each transmitter is defining the period of N slots. Each transmitter selects randomly one slot in that it transmits.

Before each transmission, the transmitter reads from the controller at the node the value that needs to be transmitted; the value is normalized between 0 and 1. This value is mapped to a current between 0 and $I_{100max}$.

Then, the transmitter is injecting the second harmonics current in the selected slot. The current is also a sinusoid that begins with phase 0 at the beginning of the slot.

Figure 9:
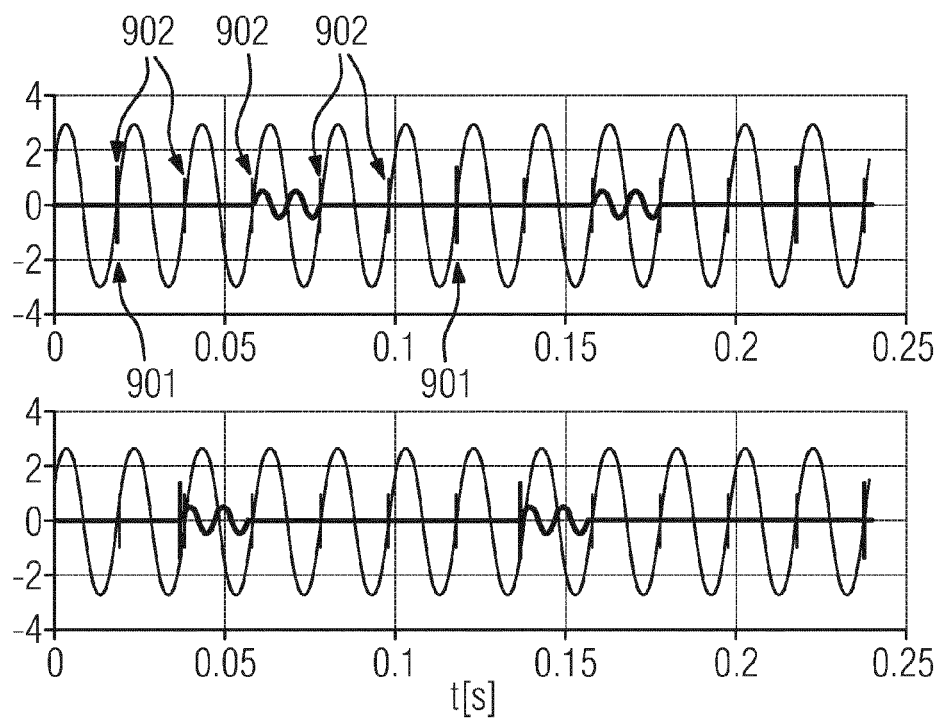
FIG. 9 is an example representation of the transmission operation of communication signals.

The above operation is illustrated in FIG. 9 for two masters, with N=5. With vertical longer lines 901 marking the beginning of the periods of the transmission, each N periods of the fundamental component and with shorter lines 902 the beginnings of the slots (one is overlapping with the beginning of the period). The periods are not synchronized between the transmitters (masters). The slots begin when the fundamental is crossing the zero line and the voltage is increasing. According to the upper subimage of FIG. 9, the first master is injecting the second harmonics current at slot 3, while the second in the slot 1. The frequency of the fundamental component is 50.05 Hz (different than the nominal frequency of 50 Hz), and there is a phase difference of 3 degrees between the fundamental components. These small differences cannot be visualized in FIG. 9.

Signal detection is performed by each participant in the communication grid, no matter even during transmission. In the signal detection, the total amplitude of the communication signal is estimated, e.g., in the On/Off modulation, the sum signal transmitted in all the slots is estimated. Additionally, due to the configuration of the number of slots substantially larger than the number of transmitters, interference may be detected and canceled from the signal, as it will be described below.

Parameters (Fixed, Defined for the System)

N—number of slots in one period, e.g. N=50;

M—upper bound on the number of possible transmitters, e.g. M=25. Parameter N and M may be used in the detection of any continuous interference. If there are no more than M transmitters, then in NM slots only the interference should be present. Even if there are more than M transmitters, slots are selected randomly, so many may be overlapping while at least in NM slots no communication transmitter is sending a signal, and the interferer is received alone.

$\Delta A_{interf}, \Delta \varphi_{interf}$—Thresholds used in deciding if the signal is the same in different slots, e.g., the detection errors are in the range of:

$\Delta \varphi_{interf}$=0.1 Volt and $\Delta \varphi_{interf}$=3 degrees $A_{sensit}$—sensitivity on the detection of the second harmonics, as a threshold used for deciding if in a slot there is useful signal that may be added to the total communication signal. Not all the slots are added up to avoid summing up only noise. $A_{sensit}$ has similar meaning with $\Delta \varphi_{interf}$ and may be set to the same value $A_{sensit}$=0.1 V.

Operation

Each Receiver Detects the Fundamental Component of the Power Signal, Amplitude, Frequency and Phase This act is the same as in the case of the transmission, both operations may use the same implementation and process.

The tracking of the fundamental component may be performed continuously to avoid errors due to the variation of the frequency, and, more importantly, propagation and increase of the phase error due to small errors in the frequency estimation.

At least two periods plus a few samples to compensate for frequency differences between the fundamental and the nominal frequency are needed. In the processing, roughly three periods of the fundamental are selected, beginning from approximately the middle of the period, see FIG. 10. In the upper subimage of FIG. 9, the received signal r is depicted, wherein the lower subimage of FIG. 9 depicts the second harmonics.

For selecting the period of signal for analysis, the precision does not need to be high. The algorithm itself processes the data so that the orthogonality of the signals is best achieved.

Figure 10:
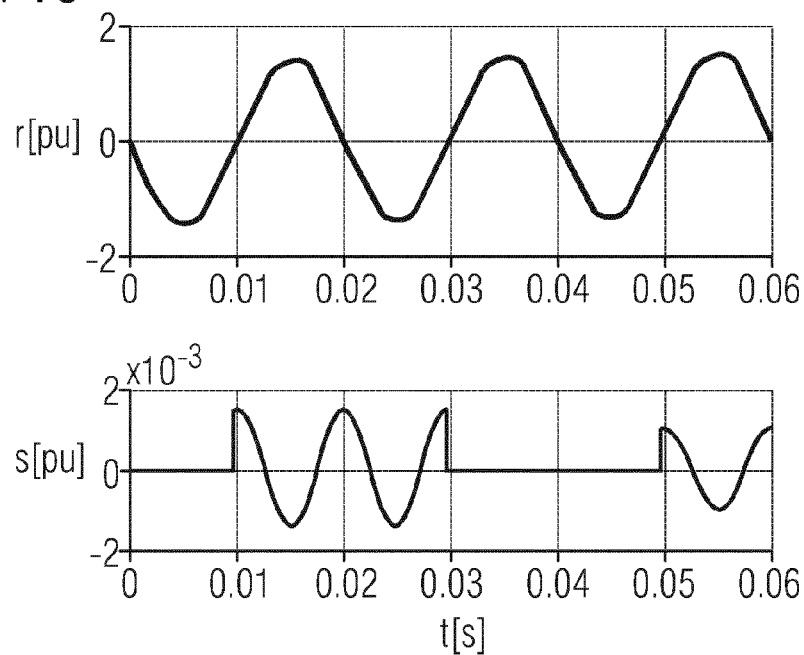
FIG. 10 illustrates an example representation of the signal selected for detection.

Detecting Communication Signal in the First Slot (Complete Fundamental Period) of the Selected Signal In FIG. 10, the 2nd harmonics are present in the first slot (from t≅0.01 to t≅0.02 s). The exact beginning and end of the slot are computed based on the frequency and phase of the fundamental, detected at act 1.

The detection of the second harmonics has two portions: a.) the fundamental component is subtracted from the received signal, to eliminate the strongest interference from the detection, and b.) then the second harmonic is detected with any methods including simple FFT or the Goertzel method. For the detected slot, the amplitude and the phase of the second order harmonics is stored.

Data from next period of the fundamental is collected and the process is repeated until data is detected for N slots, e.g., one period of the On/Off modulation.

On/Off Processing with Interference Suppression

First, the presence of interferers is checked for. An interferer may be recognized in that it is detected in several slots with same amplitude and phase, e.g., an interferer is transmitting continuously and not in only one slot.

If there are N slots and M is the upper bound on the number of transmitters, then the interferer may be received alone, not superimposed with the communication transmissions, in at least N−M slots. Consequently, it may be detected with the same (up to the detection error, $\Delta A_{interf}$, $\Delta \varphi_{interf}$) amplitude and phase. If interference and useful signal are superimposed in one slot, then this slot is going to have a different amplitude and phase than a slot where only the interferer is present. Also, if there are several interferers, each interferer will be detected as an interferer with amplitude and phase equal with the trigonometric sum of the interferers without any impact on the detection of the communication scheme.

If an interferer has been identified, the amplitude and the phase of the interferer is computed as the mean of the detected amplitudes and the mean of the phases in the slots marked as interferer only slots.

The slots with useful signals are identifier, as the slots where the detected amplitude is above a predefined noise level ($A_{sensit}$) and it was not previously identified as slot with interferer only. If an interferer was detected, then the signal of the interferer is subtracted from all the slots with the useful signal. Given two sinus signals (communication modulation and interference), the sum of the signals is also a sinus signal. The communication signal may be obtained back by making the difference from the received sinus signal and the detected interferer:

$$A\sin(\omega t + \alpha) + B\sin(\omega t + \beta) =$$
$$\sqrt{[A\cos\alpha + B\cos\beta]^2 + [A\sin\alpha + B\sin\beta]^2} \cdot \sin\left(\omega t + \tan^{-1}\left(\frac{A\sin\alpha + B\sin\beta}{A\cos\alpha + B\cos\beta}\right)\right)$$
$$A\sin(\omega t + \alpha) - B\sin(\omega t + \beta) = A\sin(\omega t + \alpha) + B\sin(\omega t + \beta + \pi)$$

The sum communication detected signal is computed as the sum of the estimated useful signals. The sum is done trigonometrically with the equation above.

Output Normalization

For the control input, the received signal is normalized.

To avoid producing a control signal due to noise only, the signals below the noise level are set to zero, so output signal is zero.

For the control of the voltage with reactive power, only the part of the signal depending on the grid reactance is selected. The selected signal is equal with the imaginary part of the complex representation of the detected amplitude and phase.

The value is normalized to the detected signal in the case the device would be transmitting with full current $I_{100max}$ alone, value that is proportional also with the grid reactance. To determine this value, the device transmits the communication signal for a short period when certain of no voltage problems. Criteria may be followed to provide that no other communication signal is present. For example, the detection is performed and no communication signal is detected.

Locally measured voltage value is below a given threshold, e.g. U<102% of the nominal value.

The estimation of the grid may be performed regularly, every few hours or days.

To further avoid that, because of sudden changes of the voltage in the grid (e.g. in the case of tap changes), a random delay may be implemented so that the signal transmission is performed after a random time (e.g. 1 to 1000 periods of the fundamental).

If the signal estimated is below the noise level ($A_{sensit}$), then the device is strongly connected to the grid and will not be able to influence the voltage with reactive power. The device should not participate in the control scheme, so the output is set to zeros.

Otherwise, the signal sent to the controller by the communication unit will be the reactive part of the detected sum signal from point 4, normalized to the detected reactive part when the device is transmitting with full current by itself.

Figure 11:
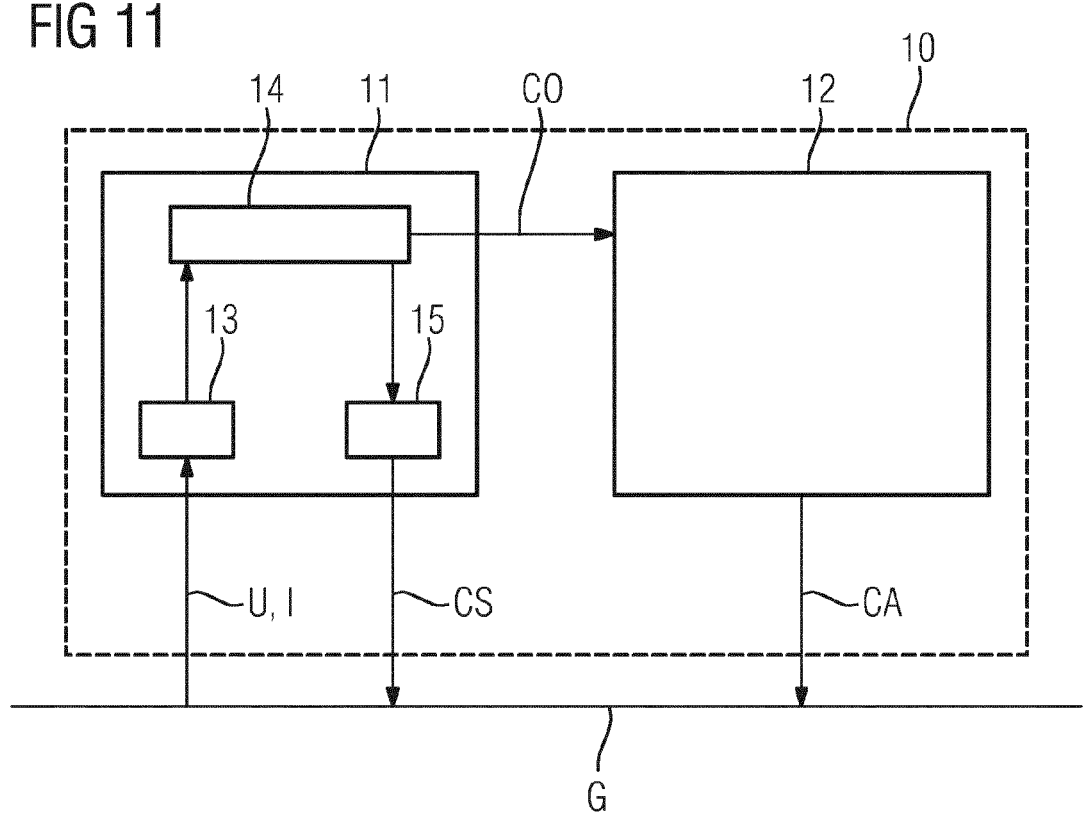
FIG. 11 illustrates an embodiment of a device for signaling and controlling in a power grid coupling a plurality of actuators.

FIG. 11 depicts an embodiment of a device 10 for signaling and controlling a power grid G coupling a plurality of actuators A, B, C providing power signals. The device 10 is coupleable to an actuator or node in the power grid G. The device 10 includes a first entity 11 and a second entity 12. The first entity 11 communicates with second entities of other nodes. In an analogous way, the second entity 12 of the device 10 of FIG. 11 communicates with first entities of other nodes.

The first entity 11 is configured to generate a communication signal CS when the coupled node has a voltage problem. Then, the first entity 11 transmits the generated communication signal CS over the power grid G.

The second entity 12 is configured to receive a transmitted communication signal CS from another node to generate the control action CA based on the received communication signal CS and to transmit the generated control action CA over the power grid G towards the sender of the communication signal CS.

In detail, the first entity 11 includes a receiver 13 for receiving signals from the grid G, in particular voltage U and current I. Because the communication signal CS is a current modulated on the power signals of the power grid G, it is particularly received as a current I at the receiver 13. Further, the first entity 11 includes a controller 14 for controlling a signal generator 15 that generates the communication signal CS in dependence on the respective detected voltage problem. Furthermore, the controller 14 is configured to provide a command CO for generating the control action to the second entity 12.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for signaling and controlling a power grid coupling a plurality of actuators for providing power signals, the method comprising:
at a first actuator of the plurality of actuators,
detecting a voltage problem,
generating a communication signal based on the detected voltage problem, and
transmitting the generated communication signal over the power grid; and
at a second actuator of the plurality of actuators,
receiving the transmitted communication signal,
generating a control action based on the received communication signal, and
transmitting the generated control action over the power grid towards the first actuator.

2. The method of claim 1, wherein an amplitude of the control action is generated, wherein the amplitude of the control action is a function of an amplitude of the received communication signal, and wherein the amplitude of the control action is proportional to an amplitude of the received communication signal.

3. The method of claim 1,
wherein the control action is generated at the second actuator such that the following equation is fulfilled:

$$\frac{A_{Rx}^C}{A_{Tx}^C} = \frac{A_{Rx}^P}{A_{Tx}^P}$$

wherein $A_{Tx}^C$ designates an amplitude of the generated communication signal at the first actuator,
wherein $A_{Rx}^C$ designates an amplitude of the received communication signal at the second actuator,
wherein $A_{Tx}^P$ designates an amplitude of the generated control action at the second actuator, and
wherein $A_{Rx}^P$ designates an amplitude of the received control action at the first actuator.

4. The method of claim 1,
wherein at least two second actuators of the plurality of actuators: receive the transmitted communication signal, generate a respective control action based on the respective received communication signal, and transmit the respective generated control action over the power grid towards the first actuator.

5. The method of claim 1,
wherein the communication signal is a current injected into the power grid by the first actuator.

6. The method of claim 5,
wherein the communication signal is generated such that a frequency of the current is proportionally related to a fundamental frequency of the power signals transmitted by the plurality of actuators over the power grid.

7. The method of claim 5,
wherein the communication signal is generated such that the current is a harmonic of a fundamental frequency of the power signals transmitted by the plurality of actuators over the power grid.

8. The method of claim 5,
wherein the communication signal is generated such that the current is an even harmonic, wherein the even harmonic is a second harmonic of a fundamental frequency of the power signals transmitted by the plurality of actuators over the power grid.

9. The method of claim 5,
wherein the communication signal is generated such that the current is an interharmonic of a fundamental frequency of the power signals transmitted by the plurality of actuators over the power grid.

10. The method of claim 1,
wherein the communication signal is modulated by On/Off-keying.

11. The method of claim 10, comprising:
synchronizing the modulated communication signal by a fundamental frequency of the power signals.

12. The method of claim 10,
wherein, as long as a voltage problem is detected at the first actuator, a communication signal is generated based on the detected voltage problem and transmitted over the power grid each transmission period, wherein the transmission period includes N periods of the fundamental frequency of the power signals.

13. The method of claim 12, comprising:
   detecting the fundamental frequency of the power signals;
   defining the transmission period with N transmission slots;
   selecting one transmission slot within the N transmission slots for transmitting the communication signal;
   calculating an amplitude of the current of the communication signal based on the detected voltage problem; and
   injecting the current with the calculated amplitude and a frequency of a second harmonic of the fundamental frequency of the power signals in the selected transmission slot into the power grid.

14. The method of claim 2, wherein the control action is generated at the second actuator such that the following equation is fulfilled:

$$\frac{A_{Rx}^C}{A_{Tx}^C} = \frac{A_{Rx}^P}{A_{Tx}^P}$$

wherein $A_{Tx}^C$ designates the amplitude of the generated communication signal at the first actuator,
wherein $A_{Rx}^C$ designates the amplitude of the received communication signal at the second actuator,
wherein $A_{Tx}^P$ designates the amplitude of the generated control action at the second actuator, and
wherein $A_{Rx}^P$ designates an amplitude of the received control action at the first actuator.

15. The method of claim 2, wherein at least two second actuators of the plurality of actuators: receive the transmitted communication signal, generate a respective control action based on the respective received communication signal, and transmit the respective generated control action over the power grid towards the first actuator.

16. The method of claim 3, wherein at least two second actuators of the plurality of actuators: receive the transmitted communication signal, generate a respective control action based on the respective received communication signal, and transmit the respective generated control action over the power grid towards the first actuator.

17. The method of claim 2, wherein the communication signal is a current injected into the power grid by the first actuator.

18. The method of claim 2, wherein the communication signal is a current injected into the power grid by the first actuator.

19. A non-transitory computer readable medium including instructions that when executed are operable to:
   detect a voltage problem at a first actuator of a plurality of actuators;
   generate a communication signal based on the detected voltage problem;
   transmit the generated communication signal over a power grid;
   receive the transmitted communication signal at a second actuator of the plurality of actuators;
   generate a control action based on the received communication signal; and
   transmit the generated control action over the power grid towards the first actuator.

20. A device for signaling and controlling a power grid coupling a plurality of actuators providing power signals, the device comprising:
   a first entity coupleable with a first actuator of the plurality of actuators and configured to generate a communication signal based on a detected voltage problem and configured to transmit the generated communication signal over the power grid; and
   a second entity coupleable with a second actuator of the plurality of actuators, the second entity configured to receive the transmitted communication signal, generate a control action based on the received communication signal, and transmit the generated control action over the power grid towards the first actuator.

* * * * *